US006970866B1

(12) United States Patent
Pravetz et al.

(10) Patent No.: US 6,970,866 B1
(45) Date of Patent: Nov. 29, 2005

(54) FILTER FILE SYSTEM

(75) Inventors: James D. Pravetz, Sunnyvale, CA (US); Richard L. Sites, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 453 days.

(21) Appl. No.: 10/159,161

(22) Filed: May 31, 2002

(51) Int. Cl.[7] .............................................. G06F 17/30
(52) U.S. Cl. ........................... 707/3; 707/10; 707/102; 707/103 R; 707/201; 707/205
(58) Field of Search .......................... 380/9; 707/2, 10, 707/100, 104.1, 203, 1, 3, 102, 103 R, 200, 707/201, 205; 709/201, 203, 206, 219, 220, 709/227, 214, 223, 231; 715/513; 705/59; 370/352

(56) References Cited

U.S. PATENT DOCUMENTS

| | | | |
|---|---|---|---|
| 5,781,785 A * | 7/1998 | Rowe et al. ................. | 715/513 |
| 5,958,006 A * | 9/1999 | Eggleston et al. .......... | 709/219 |
| 5,978,847 A | 11/1999 | Kisor et al. | |
| 5,991,402 A * | 11/1999 | Jia et al. ........................ | 705/59 |
| 6,249,794 B1 | 6/2001 | Raman | |
| 6,298,385 B1 | 10/2001 | Sparks et al. | |
| 6,401,093 B1 | 6/2002 | Anand et al. | |
| 6,401,239 B1 | 6/2002 | Miron | |
| 6,427,149 B1 | 7/2002 | Rodriguez et al. | |
| 6,473,749 B1 | 10/2002 | Smith et al. | |
| 6,807,550 B1 * | 10/2004 | Li et al. ...................... | 707/201 |
| 2002/0131404 A1 * | 9/2002 | Mehta et al. ................ | 370/352 |

OTHER PUBLICATIONS

Adobe Systems Incorporated, "Portable Document Format: Changes from Version 1.3 to 1.4" Technical Note #5409, pp. iii-viii, 1-20, Jun. 11, 2001, San Jose, CA.
Adobe Systems Incorporated, "Portable Document Format: Reference Manual" Version 1.3, pp. 1-8 and 55-64, Mar. 11, 1999, San Jose, CA.

* cited by examiner

Primary Examiner—Shahid Alam
Assistant Examiner—Fred Ehichioya
(74) Attorney, Agent, or Firm—Fish & Richardson P.C.

(57) ABSTRACT

Methods and apparatus implementing a technique for retrieving requested data. In general, in one aspect, the technique includes receiving a request from an application to read a portion of an application file and consulting a filter-system file. The filter-system file contains processed data that corresponds to data in the application file and correspondence information indicating how the set of processed data corresponds to the data in the application file. The technique also includes deriving the requested portion of the application file from the processed data using the correspondence information, and delivering the requested portion of the application file to the application. In another aspect, the technique includes receiving data to be retrieved in response to a request from an application with reference to the application's view of the application file, processing the received data to generate processed data that corresponds to the received data, producing correspondence information indicating how the processed data corresponds to the received data is produced, and storing the processed data and the correspondence information in a filter-system file.

59 Claims, 12 Drawing Sheets

FILTER FILE SYSTEM

BACKGROUND OF THE INVENTION

The present invention relates to accessing data in a file.

Data files and file systems are abstractions used to organize and access data. A file is a set of data that can be accessed by a program or application with the file system of a particular operating system. Most conventional file systems have a naming system for files, and organize the named files in named folders or directories, each of which can, in turn, be included in higher-level directories. Thus, most file systems have a system of data in files, with the files organized in a directory hierarchy.

The data in a file are typically delivered to or created for an application in response to a request from the application. The application program interface (API) of some file systems allows applications to retrieve particular bytes or combinations of bytes of data in a file, even when the data are delivered when streamed over a network connection. For example, the application can use a seek function to find a particular location and then sequentially read data for some interval. Such APIs provide what is typically called random access, and allow retrieval of data from anywhere in a file. Other mechanisms for accessing data in a file, for example sequential access, normally are implemented on top of a random access mechanism.

Whether the retrieved data are decipherable by the application can depend, however, on the particular application and the format of the file. Data that are stored in standardized formats such as ASCII text are readily accessible. For example, such data can be deciphered, or processed, by any word processor or text editor and, if streamed over a network, can be processed as they are received.

When data are delivered by streaming, some file formats may require that the file data be provided in its entirety before any of the data in the file can be processed by a particular application. For example, some viewers for Adobe portable document format (PDF) files may require access to data at the end of the PDF file in order to present the first page of the PDF document. In this case, access to the first page is delayed until the entire file-including—data that are not needed to present the first page—is retrieved.

The application of encryption to a file also can require that the entire file be retrieved before any portion of it can be accessed. That is, to find objects in a file that is encrypted as a block of data, the entire file must first be decrypted. The application of compression to a file can also limit access to the data in the file. The file must be decompressed from its beginning, until the desired data has been decompressed and can be located. Thus, in general, the user must choose between random access to data in a file and compression or encryption of the data in the file.

Delays in the delivery of requested portions of encrypted, compressed, and specialized files can be significant if the file is large relative to the requested portion of the file or if the requested portion is close to the end of the file. In these cases and without random access, the user must wait for the delivery of relatively large portions of unrequested data. Any such delay can be exacerbated if the file is being delivered over a network, where the rate of delivery is limited by hardware capabilities and network traffic.

SUMMARY OF THE INVENTION

In general, in one aspect, this invention provides methods and computer program products for retrieving requested data. A request is received from an application to read a portion of an application file. The application file is formatted to be recognized by the application. A filter-system file is consulted. The filter-system file contains processed data and correspondence information. The processed data includes a set of processed data that corresponds to data in the application file and the correspondence information indicates how the set of processed data corresponds to the data in the application file. The requested portion of the application file is derived from the processed data using the correspondence information, and delivered to the application.

Advantageous implementations of the methods and computer program products can include one or more of the following features. The requested portion can include less than all of the application file. The correspondence information can be referenced in a header at the beginning of the filter-system file. The correspondence information can include a cross-reference table in the filter-system file. The cross-reference table can be at the beginning of the filter-system file. The request from the application can reference an application file and the requested portion of the application file can be derived by reading data from the filter-system file through a filter-system API in response to the application request. The processed data can further include a second set of processed data corresponding to data in a second application file, and the correspondence information can further indicate how the second set of processed data corresponds to the data in the second application file.

The application file can have two or more sections of data and the filter-system file can have two or more blocks of data, with each block corresponding to one or more sections in the application file, and the correspondence information can indicate the locations of the sections in the application file, the locations of the blocks in the filter-system file, and the correspondence between sections in the application file and blocks in the filter-system file. The filter-system file can have at least one block of data corresponding to data in a second application file, and the correspondence information can further indicate the correspondence of the at least one block of data in the filter-system file and the second application file. The two or more sections of data can be defined independently of the native structure of the application file. The two or more sections of data can be defined by the native structure of the application file. A section of data can be an object in the application file. A section of data can be a linked file represented in the application file by a link.

Finding the requested portion of the application file by using correspondence information can include determining which section in the application file contains the requested data and identifying the corresponding block in the filter-system file. The requested portion of the application file can be a byte range. The method can further include streaming a necessary block, where the necessary block corresponds to a section including some of the requested portion of the application file, before streaming an unnecessary block that precedes the necessary block, where the unnecessary block corresponds to a section having none of the requested portion of the application file. Delivering the requested portion of the application file can include delivering a section that contains some of the requested data before delivering a section that does not contain any of the requested data.

Deriving the processed data can include applying a filter to the processed data to produce the requested data. Applying a filter can decrypt or decompress processed data in the filter-system file. The method can further include using the correspondence information to identify the filter, and obtaining the filter. Using the correspondence information to identify a filter can include using a designated data type to identify a registered filter. The correspondence information can include parameters for use in applying the filter when decoding the data. The method can include applying two or more filters to produce the requested data. A first filter can decrypt processed data to produce decrypted data and a second filter can decompress the decrypted data. A first filter can decompress the processed data to produce decompressed data and a second filter can decrypt the decompressed data.

In general, in another aspect, the invention provides methods and computer program products for generating a filter-system file. Data that is associated with an application file is received. The application file is an application's view of the received data, and the application is operable to request a portion of the application file. The received data is processed to generate processed data that corresponds to the received data. Correspondence information that indicates how the processed data corresponds to the received data is produced. The processed data and the correspondence information are stored in a filter-system file.

Advantageous implementations of methods and computer program products can include one or more of the following features. The information indicating the correspondence between the processed data and the data received can be referenced in a header at the beginning of the filter-system file. The correspondence information can be in a cross-reference table in the filter-system file. Receiving data associated with an application file can include receiving data from an application. Receiving data associated with an application file can include receiving data from an application file in response to a request from an application.

Processing the received data can include identifying two or more sections and generating two or more processed blocks, where each processed block corresponds to a section of data received; and the correspondence information can identify the location of each section in the data received, the location of each processed block in the filter-system file, and the correspondence between each section in the data received and each processed block in the filter-system file. Processing the data received can include ordering the blocks of data differently than the corresponding sections of received data in the application file. The two or more sections can be from two or more application files. Processing the data received can include ordering the blocks of data so that a block corresponding to a section from a second application file is between two blocks corresponding to sections from a first application file. Each section or block can be defined by a byte range. The order of the blocks can permit streaming a necessary block, which corresponds to a section including some of the requested portion of the application file, before streaming an unnecessary block that precedes the necessary block, where the unnecessary block corresponding to a section having none of the requested portion of the application file.

Processing the data received can include applying a filter to at least a portion of the data received. Applying a filter can encrypt or compress at least a portion of the data received. Processing the data received can include retrieving a filter, applying the filter to some of the data received, and producing correspondence information to identify a filter to be used to respond to a request for a portion of the application. Producing correspondence information to identify a filter can include identifying a data type that identifies a registered filter. The correspondence information can include parameters for use in applying the filter. Applying a filter can include applying two or more filters to produce the requested data. A first filter can encrypt processed data to produce encrypted data and a second filter can compress the encrypted data. A first filter can compress the processed data to produce compressed data and a second filter can encrypt the compressed data.

In general, in another aspect, the invention provides a filter-system file. The filter-system file includes processed data that corresponds to data in an application file, and correspondence information that indicates how the processed data corresponds to the data in the application file. The filter-system file is operable to derive a requested portion of the application file from the processed data.

The invention can be implemented to realize one or more of the following advantages. An application can receive and process portions of a data file without receiving the entire data file. An application can open a file before all of the file is received. A requested portion of an application file can be delivered before nonrequested portions are delivered, thereby shortening the time of delivery of the requested data. Filters can be selectively applied to portions of an application file, for example, to encrypt or compress them. A file can be encrypted or compressed without sacrificing the ability to access portions of the file. A file can be decrypted or decompressed without introducing large lags in delivery and without saving decrypted versions to disk. A file can be reordered to optimize compression or encryption for downloading over a network. A file can be processed according to user or application instructions. Arbitrary and external filters can register with the file system and can be used to process data in a file of a registered type. Application files of more than one registered type can be collected into a single file. Portions of different files can be combined and interleaved in a single file. Data in one or more files can be accessed efficiently.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

Figure 1:
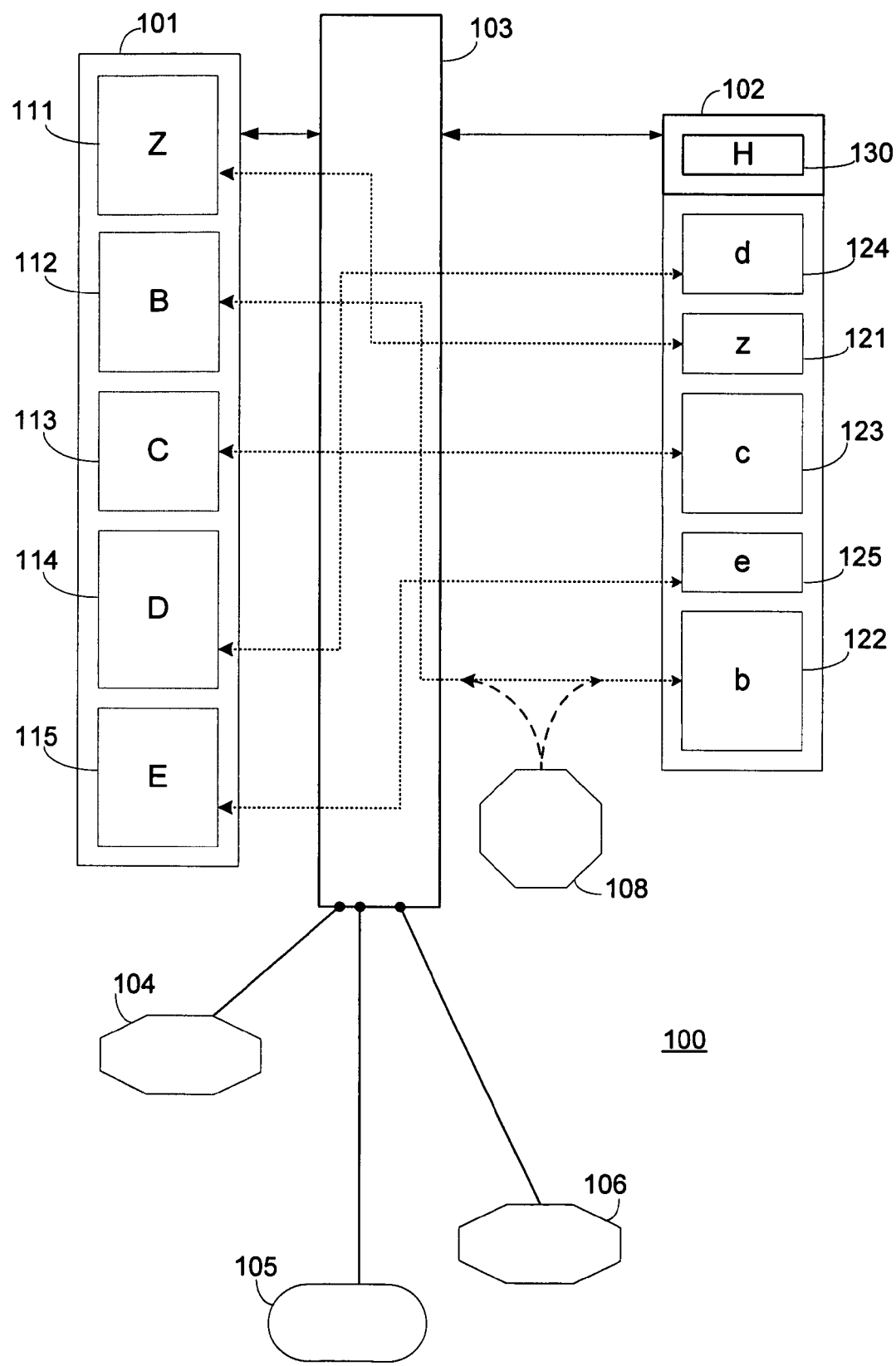
FIG. 1 shows how a filter file system relates data in an application file to data in a filter-system file using a layer of code and a variety of filters.

A filter file system 100 relates data in an application file 101 to data in a filter-system file 102 using a layer of code 103 and a variety of filters 104, 105, 106, 108, as shown in FIG. 1. Data in an application file 101 can be accessible to an application with a conventional file system. Data in a filter-system file 102 are accessible to the application with a filter-file system. The filter file system includes a layer of code 103 that can receive requests from an application for data in an application file 101 and retrieve the requested data from the filter-system file 102.

The application file 110 can be a virtual file. In this case, data in the application file are accessible only with a filter file system. The application makes requests for data from a virtual application file in the same way that it would make requests for data if the virtual application file were an application file. However, the data that are requested can only be retrieved from the filter-system file with the filter file system.

In the filter file system, the data in the application file 101 can be divided into sections, for example Z 111, B 112, C 113, D 114, E 115. Typically, the data are divided into several sections. The data in each section can be processed by the filter file system independently from data in other sections. The data in one or more sections of the application file 101 are used to create one or more blocks of data in the filter-system file 102. In a simple example and as shown in FIG. 1, each section is used to create a single block. For example, the data of section Z 111 are processed to produce the data of block z 121. Similarly, the data of sections B 112, C 113, D 114, and E 115, are processed to produce blocks b 122, c 123, d 124, and e 125, respectively.

Conversely, the data in one or more sections of the application file 101 can be derived from the data in one or more corresponding blocks in the filter-system file 102. That is, the blocks of data in the filter-system file 102 can be processed to produce the sections of data in the application file 101. In a simple example and as shown in FIG. 1, each section can be derived from a single corresponding block. For example, the data of section Z 111 can be derived from the data of block z 121. And the data of sections B 112, C 113, D 114, and E, can be derived from blocks b 122, c 123, d 124, and e 125, respectively.

Processing of sections to produce a filter-system file can include rearranging, for example, reordering, the blocks of data relative to their corresponding sections of data. A rearrangement is illustrated in FIG. 1 by the relative order of the sections in the application file 101 and the blocks in the filter-system file 102. As shown, the blocks in the filter-system file 102 are arranged or ordered differently from their corresponding sections of data in the application file 101. Thus, processing a section can include moving the data of the block that corresponds to that section so that the block occurs earlier or later in the filter-system file 102 than the corresponding section occurs in the application file 101. If the data in the blocks are identical to the data in the sections, then reordering the blocks of data relative to their corresponding sections of data is equivalent to reordering the sections of data.

Processing of sections to produce blocks, and processing of blocks to produce sections, can include filtering the data in a section or block. Filtering requires filters. Filters are computer programs that can translate or transform one set of data into another. Filters can be used, for example, to compress the data in a section of the application file 101, or decompress the data in a block in the filter-system file 102. Filters also can be used, for example, to encrypt the data in a section, or decrypt the data in a block.

One or more filters can be applied selectively to sections or blocks. For example, filters can be applied to some sections and not others, and multiple filters can be applied to a section. Such selectivity can provide access to some but not all data in the file. For example, blocks of data that were not filtered can be searched by simple parsing tools, while access to other blocks is limited, for example, by their having been compressed or encrypted.

The compression and decompression of data in the filter file system 100 is illustrated by the relative size of the sections in the application file 101 and their corresponding blocks in the filter-system file 102. For example, section Z 111 in the application file 101 can be compressed to produce block z 121 in the filter-system file, and block z 121 can be decompressed to produce section Z 111. Encryption is shown by a similarly sized section and corresponding block. For example, section C 113 in the application file 101 can be encrypted to produce block c 123 in the filter-system file 102, and block c 123 can be decrypted to produce section C 113.

Filters to be applied to blocks in a filter-system file 102 are external to the filter-system file. Filters that are to be applied to blocks in a filter-system must be identified or referenced in the filter-system file to which they are to be applied. For example, a filter 104 that must be applied to block z 121 to produce section Z 111 can be referenced in the header section 130 of the filter-system file 102. The reference identifies the filter by a unique ID, such as a name. In most cases, parameters to be used in the application of the filter are included in the filter-system file with the reference to the filter.

Any number of filters can be used to process the data in a section or block. Multiple filters can be applied in combination or they can be applied sequentially, in a specified order. For example, a compression filter 105 can be applied to the data of section D 114 of an application file 101 to produce compressed data, and then an encryption filter 106 can be applied to the compressed data to produce the data of the corresponding block d 124 in the filter-system file. In this example, the section data are first compressed and then encrypted. The data can be first encrypted and then compressed. The number of filters and the sequence in which they are applied can be optimized for a particular application.

Figure 2:
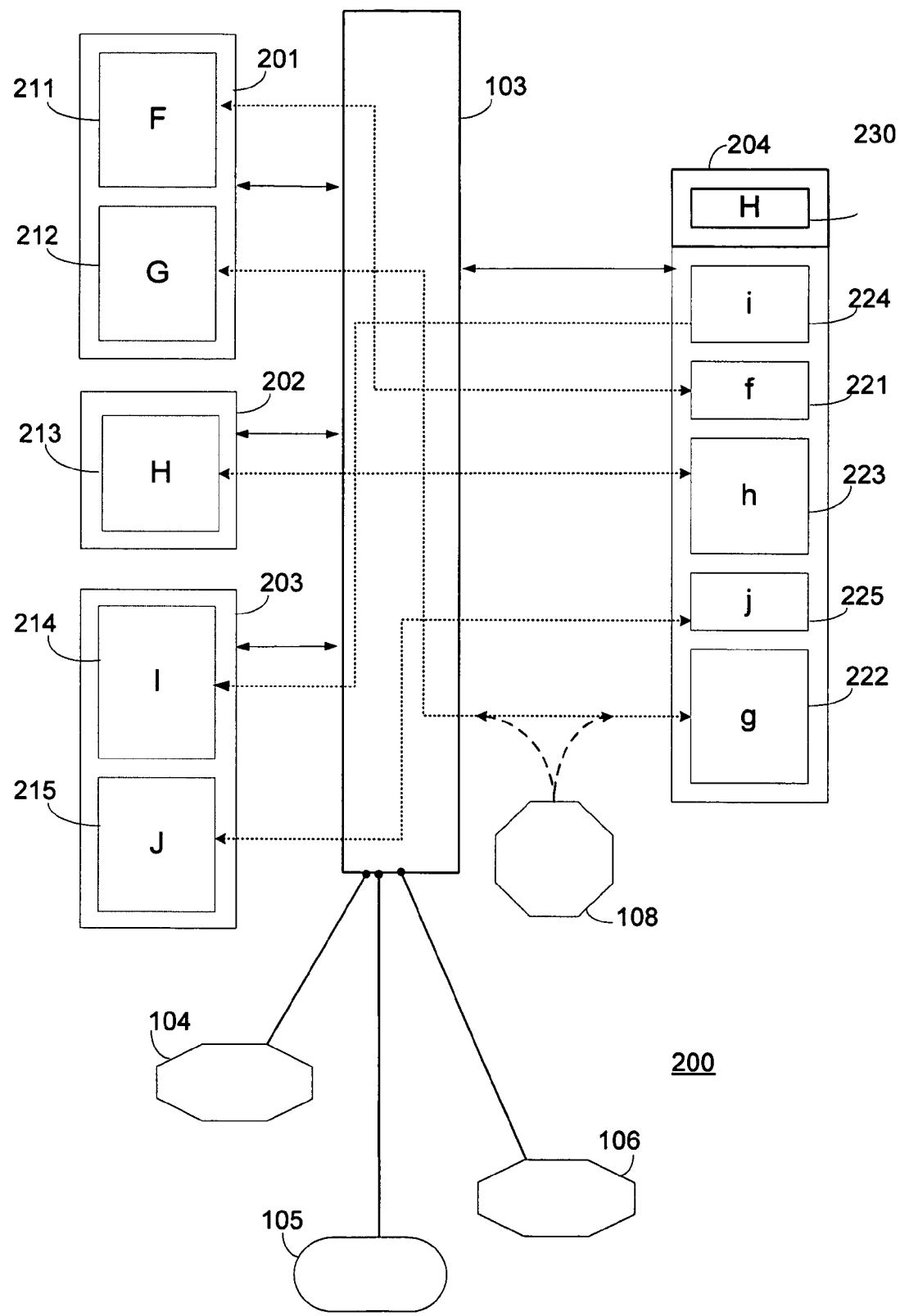
FIG. 2 shows how a filter file system relates data in several application files to data in a filter-system file using a layer of code and a variety of filters.

FIG. 2 illustrates how a filter file system 100 uses a layer of code 103 and a variety of filters 104, 105, 106, 108 to relate data in several application files 201, 202, 203 to data in a filter-system file 204. One or more of the application files can be a virtual application file; that is, one or more of the application files can be accessible only with a filter file system. The application files can be created by one or more applications.

The data in one or more of the application files 201, 203 can be divided into sections. For example one file 201 is divided into two sections F 211 and G 212, and another file is also divided into two sections I 214 and J 215. One or more application files 202 can include only a single section H 213. The data in each section can be processed independently from data in other sections, including sections in other application files, as described previously. The data in the sections of the application files 201, 202, 203 are used to create one or more blocks of data in the filter-system file 102. In a simple example and as shown in FIG. 2, each section is used to create a single block. In this way, data from sections in the several application files 201, 202, 203, are combined in a single filter-system file 204.

The data in a section, for example, section F 211, of an application file 201 can be derived from the data in one or more corresponding blocks in the filter-system file 102, as was described previously. Also, when multiple application files are represented in a single filter-system file, the data for an entire application file 202 can be derived from a corresponding block 223 in the filter-system file 204.

Figure 3:
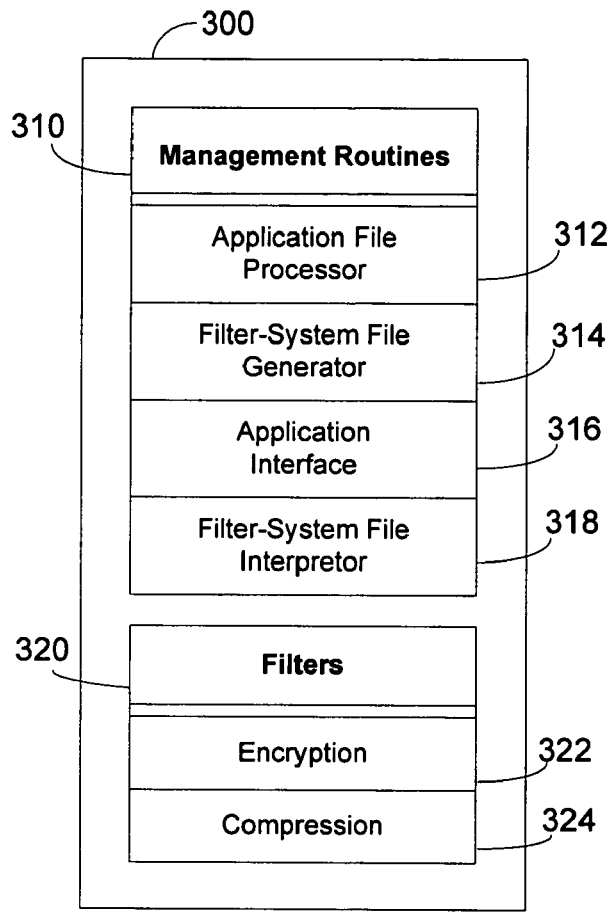
FIG. 3 presents management routines and filters that can be included in a filter file system.

As shown in FIG. 3, a filter file system 300 includes management routines 310 and filters 320. Management routines 310 are part of the layer of code 103 illustrated in FIG. 1. Filters 320 can be separate from but accessible to the layer of code 103 or they can be included in the layer of code 103.

Management routines 310 can include an application file processor 312, a filter-system file generator 314, an application interface 316, and a filter-system file interpreter 318. The application file processor 312 processes the application file 101 or data from an application. The filter-system file generator 314 uses the processed data and information about the processing or, more generally, information about the correspondence between data from an application and the processed data, to produce the filter-system file 102. The application interface 318 receives requests from an application to retrieve data from an application file. The filter-system file interpreter 318 responds to the requests by retrieving data from a filter-system file that corresponds to the requested data and deriving the requested data from the corresponding data in the filter-system file. The interpreter can, for example, process the data in the filter-system according to the correspondence information.

Filters can include encryption filters 322, compression filters 324, and other encoder/decoder applications. Management routines can use filters to process data in an application file to produce data for a filter-system file, or to process data in a filter-system file to produce data in an application file.

Figure 4:
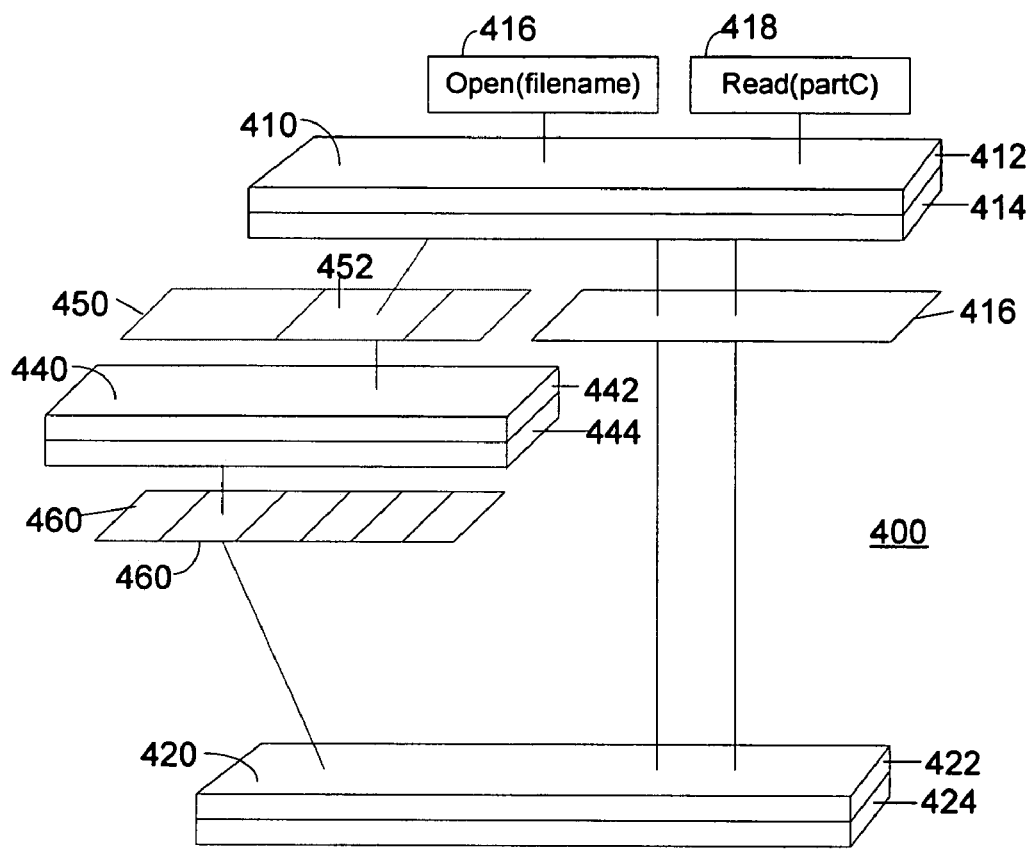
FIG. 4 illustrates how a filter file system interfaces with an application and a conventional file system.

FIG. 4 illustrates how a filter file system interfaces with an application 410 and a conventional file system 420. The application 410 has a user interface 412 and a file system interface 414. A user makes requests for data at the user interface 412. For example, the user can request a page from a file. The application translates the user's request into a request that is understood by the file system. For example, the application can request to open a file 416 or to read particular data 418 in a file. In this way, the application 410 uses the file system interface 414 to perform the user's request on a file system.

As shown on the right side of FIG. 4, a request from the application 410 is made to a conventional file system 420. The conventional file system has an application interface 422 and a system interface 424. The request is passed through the interface between the application and the conventional file system, with reference to the application file 430. The conventional file system translates the application's request and passes it to the system at its system interface 424, for example to retrieve data from storage on a disk. In this way, an application 410 uses a conventional file system 420 to access stored data in terms of an application file 430.

As shown on the left side of FIG. 4, a request from the application 410 is made to a filter file system. The filter file system includes a layer of code 440 that has an application interface 442 and a file system interface 444. The layer of code 440 operates between the application 410 and the conventional file system 420. The application makes requests for data from an application file in response to user input 450. The layer of code 440 translates the application's request and passes it to, for example, the conventional file system 420. The translated request is made through the interface between the layer of code of the filter file system and the conventional file system, with reference to a filter-system file 460.

The layer of code 440 can be coupled to the application 410. For example, the layer of code 440 can be packaged as a plug-in for the application 410, or can be a part of the application. The layer of code also can be coupled to the conventional file system or operating system. The layer of code can be a free-standing application.

The layer of code can have its own cache buffer. The cache buffer can be used, for example, when delivering decrypted data. The cache buffer can be implemented so that access to the encrypted data is managed. For example, decrypted data can be placed as plaintext in a buffer, rather than being written to disk, and then cleared from memory as soon as it is no longer needed by the application.

With the filter file system, a conventional file system can respond to a request with reference to the filter-system file. For example, the request for a part 452 of the application file 450 is translated into a request for a part 460 of the filter-system file 460. The filter-system file is subdivided into blocks, each of which can be processed separately by the filter file system and the conventional file system. The conventional file system provides a block of the filter-system file to the layer of code, and the layer of code uses that data to provide the requested portion of the application file.

Figure 5:
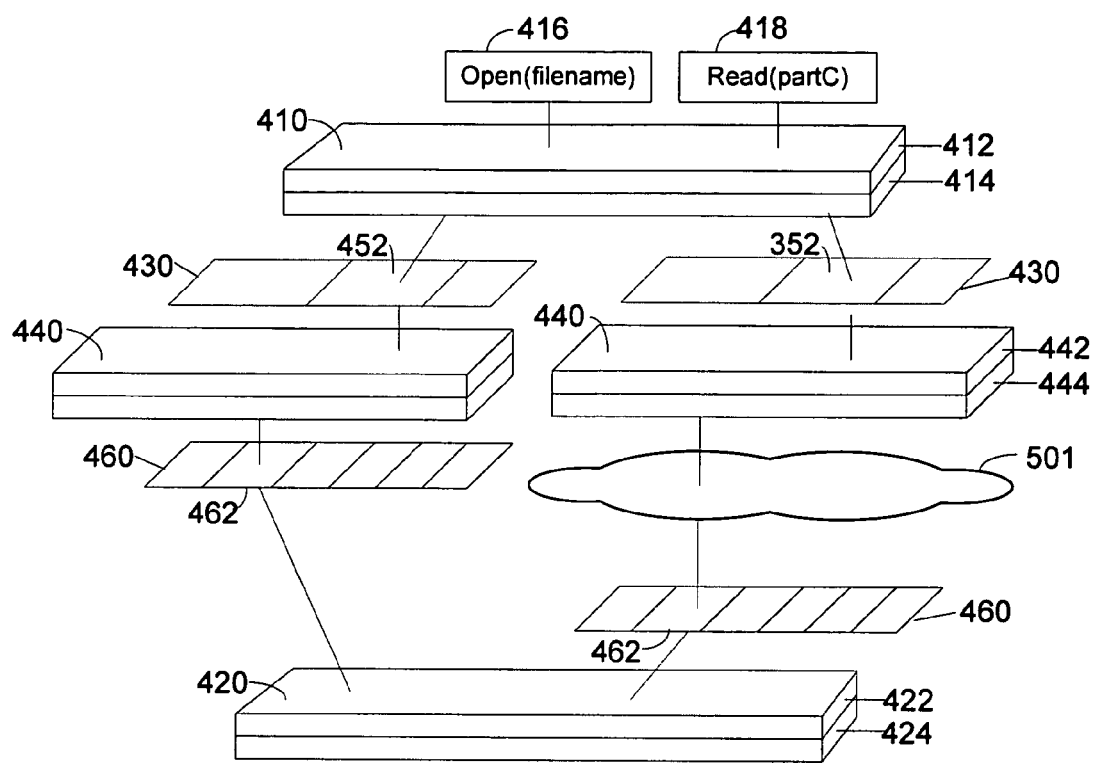
FIG. 5 illustrates how a filter file system interfaces with an application and a conventional file system over a network.

FIG. 5 illustrates how an application, filter file system, and conventional file system can interact over a network 501. As shown on the left side of FIG. 4 and the left side of FIG. 5, an application 410 makes requests for data from an application file 450. The requests are translated by a layer of code 440 in the filter file system. The translated requests make reference to a filter-system file 460, and are passed on to the conventional file system 420.

As shown on the right side of FIG. 5, a network 501 can separate the conventional file system 420, which accesses data from one computer, from the application 410, which can be hosted on another computer in a network. In one implementation, the network is interposed between the layer of code of the filter file system 440 and the conventional file system 420. That is, the application 410 and the layer of code 440 are hosted on one computer in a network and the filter-system file and conventional file system 420 are on another computer in the network.

In the example shown in FIG. 5, the application makes requests for data in terms of an application file 430. The layer of code 440 translates the application's request, so that it makes reference to a filter-system file 460. The translated request is passed over the network 401. The conventional file system 420 responds to the request with reference to the filter-system file. In response to the request from the filter-system file, the conventional file system can return a block from the file, rather than the entire file. The block is streamed over the network 401 to the layer of code 440. The layer of code 440 then processes that data to provide the requested section of the application file 430, as shown on the left side of FIG. 4 and as discussed previously.

For example, an application may request a file for delivery over a network and, in response, data from the file is streamed over the network to the application. If the application attempts to access the data before it is all received, the layer of code can intervene. For example, the layer of code can assimilate data until the requested bytes are received, and then deliver the requested data to the application. In another example, the layer of code can preempt the streaming of data and request the bytes corresponding to the data requested by the application. In yet another example, the layer of code can open a new network connection and request the needed bytes of data.

The example shown in FIG. 5 can provide security advantages. For example, if encryption filters were applied to produce the block, the data that is being transferred over the network will be transferred in a secure encrypted state. If any decrypted copies of the block are made, they are on the local system, which hosts the application file and the filter file system, rather than the remote system, where the filter-system file is stored.

Figure 6:
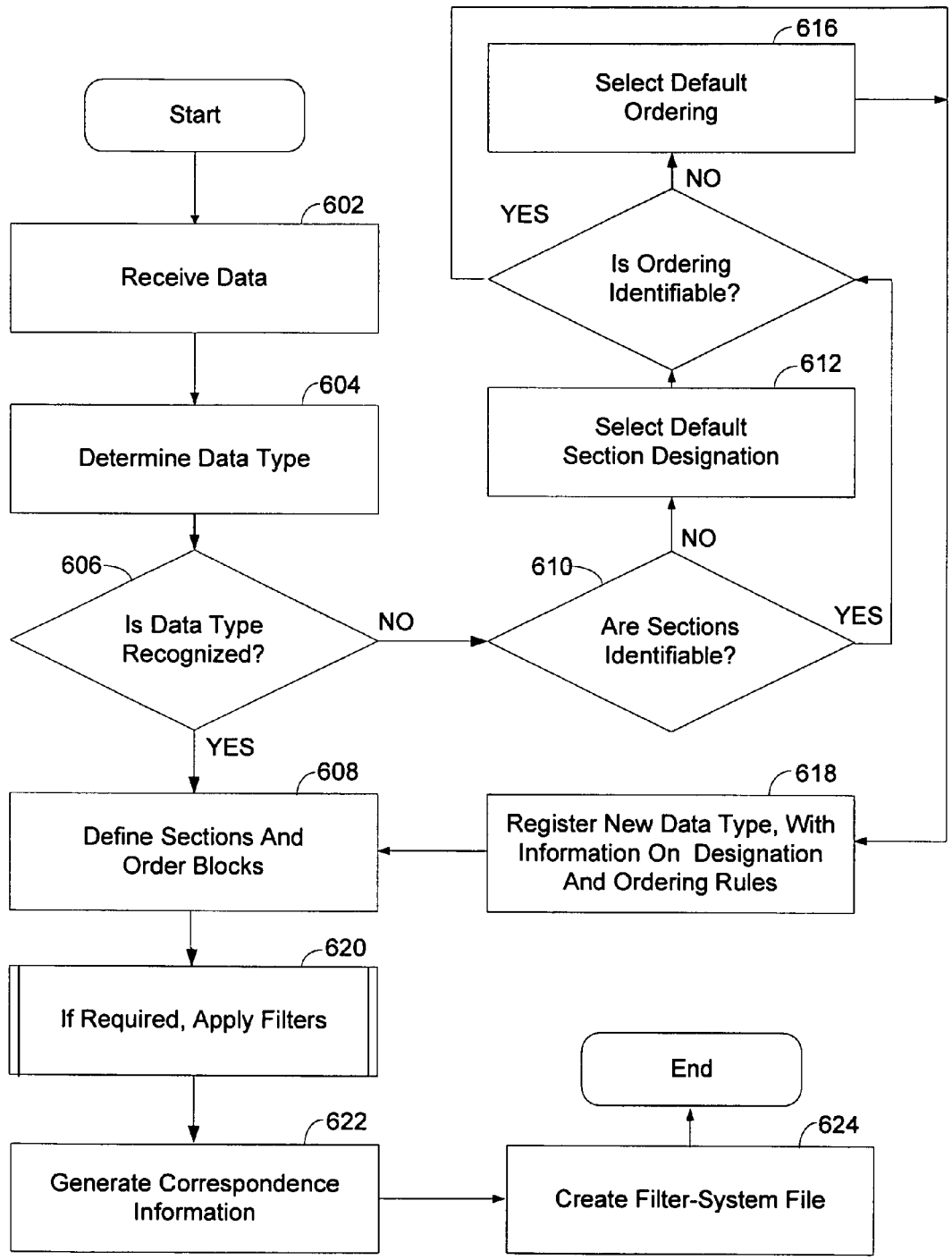
FIG. 6 illustrates a method for generating a filter-system file.

A method for generating a filter-system file is shown in FIG. 6. The filter file system receives data to be used to generate a filter-system file (step 602). In one implementation the data are received from the application, for example, in the form of write requests. In this case, the application file is a virtual file and cannot be accessed in the absence of the filter file system. Software that is specific to a particular application, commonly referred to as a 'plug-in', can be used in association with the application to create a filter system file. Plug-ins that are application-specific can be optimized for the file types associated with an application.

In another implementation, the data are received as an application file, for example, from a conventional file system. In this case, the application file can be accessible to the application without a filter file system. The filter file system typically determines the type of data received (step 604). The type of data can be inferred from the format of a received file. For example, the type of data can be ASCII text, page description format, PostScript, or any other document format type. The filter file system may or may not recognize the format of the data received (step 606). The filter file system can, for example, compare the data received to registered data types, and determine whether the data received are one of the registered data types.

If the data type is recognized (the YES branch of step 606), the filter file system processes the data. Processing includes ordering and filtering. Ordering includes identifying sections of the data received (step 608). Sections can be designated by native features of the application file format. For example, sections can be defined by page breaks in a PDF file. Ordering also includes locating the blocks that will correspond to each sections (step 608). The blocks can be in the same order as their corresponding sections, or they can be ordered differently than the sections of data received. For example, a block of data corresponding to a section of data that is received last, or is found at the end of a file, can be ordered so that it is located near the beginning of the filter-system file.

The reordering of blocks relative to sections can improve access to the data in a file. For example, the reordering can allow information about the location of data or objects in the file to be delivered before other data is delivered, such as when the file is delivered by streaming over a network.

If the data type is not recognized (the NO branch of step 608), the filter file system checks to see if sections can be identified (step 610). For example, sections can be identified by a standardized syntax or code. If the filter file system cannot identify sections (the NO branch of step 610), it chooses default rules to define sections (step 612). For example, the system can define sections that are a specified length, or it can define a specified number of sections that are equal in length.

If sections can be identified (the YES branch of step 610) or after default rules are chosen (step 612), the filter file system checks to see if ordering can be identified (step 614). For example, ordering can be identified by a standardized syntax or code. If the filter file system cannot identify ordering (the NO branch of step 614), it chooses default rules to order the blocks corresponding to the sections (step 616). For example, the system can order the blocks corresponding to sections by size or according to a particular algorithm, for example, inverted order.

Rules and their parameters can be defined by a user or can be chosen, for example based on characteristics of the data received or the filter to be applied. For example, if the file is large or the data are repetitive, or if a filter to be applied to the data operates best on larger objects, the system can define sections to be large. Rules and their parameters are advantageously defined to improve the rate of delivery over a network and allow for compression, encryption, or other forms of filtering.

If ordering can be identified (the YES branch of step 614) or after default rules are chosen (step 616), a new file type is registered with the filter file system (step 618). The registration makes it possible for the filter file system to associate the rules that it has chosen for the data received, with the type of the data received. Registering a new data type includes storing information about the data type of the data received with the chosen rules for identifying or designating sections in data of that type, and ordering the blocks corresponding to the sections.

After the data type is recognized (step 606) or registered (step 618), the rules for the data type of the data received are applied to the data (step 608). Sections of data are identified and blocks that correspond to those sections are ordered. The filter file system can apply filters to the sections of data to create the corresponding blocks (step 620). The ordering and, if filters are applied, the filtering of the received data produce processed data that will be included in the filter-system file.

The filter file system generates information to be included in a header of the filter-system file (step 622). This information includes information about how the sections were identified and ordered. If filters were applied, it includes information about the filters. The information is sufficient to allow the filter file system to reconstruct the received data from the processed data. In general, it indicates the correspondence between the received data and the processed data. The correspondence information is placed in a header, and the processed data and the header are combined to create a filter-system file (step 624).

Figure 7:
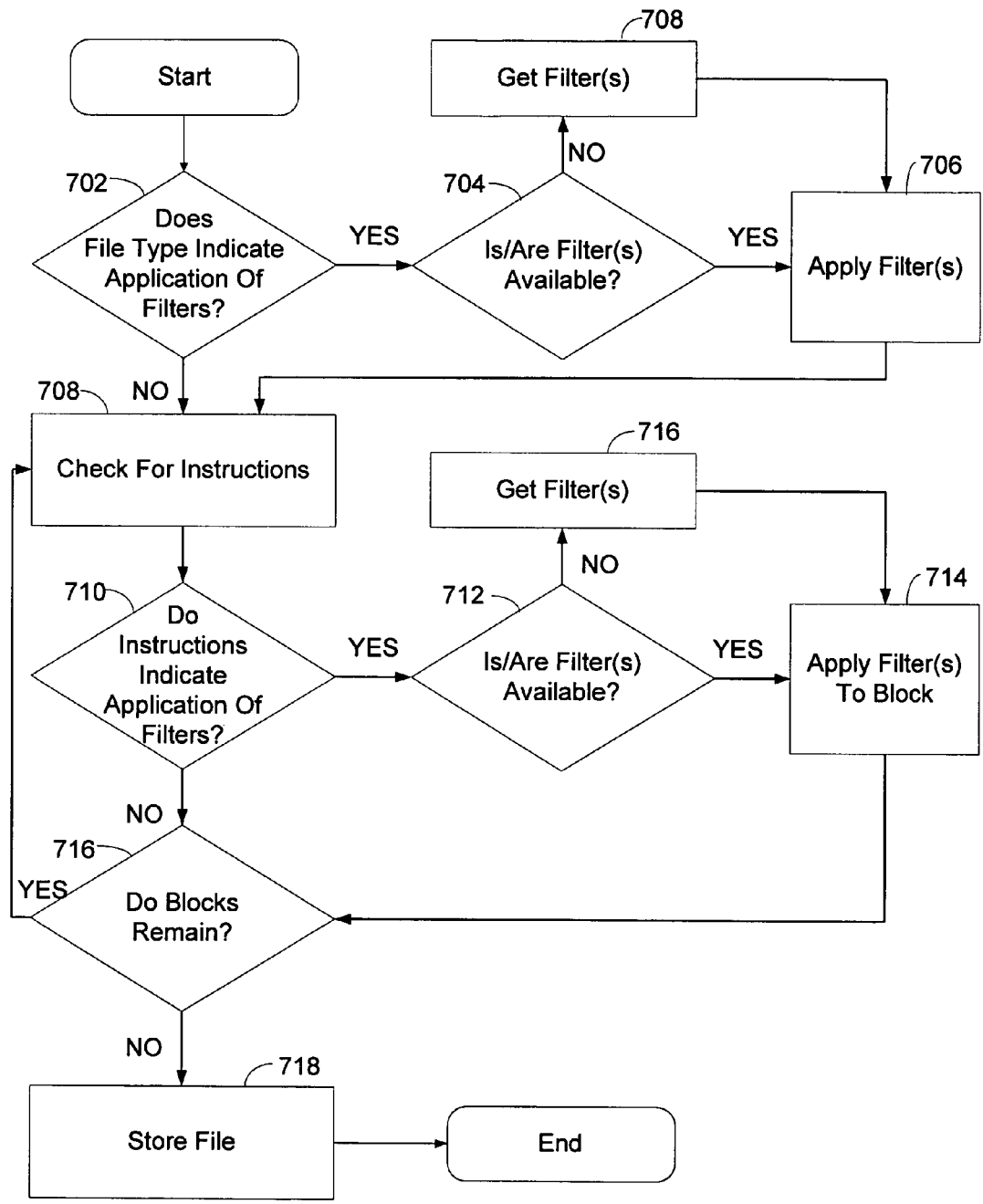
FIG. 7 illustrates a method for registering filters applied in generating a filter-system file.

A method for applying filters to a section or sections of the data received by the filter file system is shown in FIG. 7. The application of filters can be associated with the data type (step 702). That is, the filter file system can apply filters to data received according to the rules for the data type of the data received.

If the rules for a data type indicate that filters should be applied to the data received (the YES branch of step 702), the filter file system checks to see if the filter or filters are available (step 704). If the filter or filters are available (the YES branch of step 704), the filter or filters are applied to the data received (step 706). The filter or filters can, for example, be applied according to the rules for that data type. For example, a filter can be applied to all the sections received, or a filter can be applied to the first and last sections of data received. Filters can be applied in sequence to particular blocks. If the filter or filters are not available (the NO branch of step 704), the filter file system can search for the filter (step for 708). For example, the filter file system can look for appropriate files on a local system, or can broadcast requests for the filter in a network environment. The filter or filters are then applied to the section or sections of data as described previously (step 706). If the filter or filters are not available, the method cannot proceed.

For each section, if the file type does not indicate the application of filters (the NO branch of step 702), and even if it does, the filter file system checks for instructions to apply a filter or filters (step 708). For example, a user of the application may request the application of filters. If the application of filters is indicated (the YES branch of step 710), the filter file system checks to see if the filter or filters are available (step 712). If they are (the YES branch of step 712), the filter or filters are applied to the section of data (step 714). If the filter or filters are not available (the NO branch of step 712), the filter file system can search for the filter (step for 716). The filter or filters are then applied to the section of data (step 714). If the filter or filters are not available, the method cannot proceed.

If there are no instructions to apply a filter or filters to a section (the NO branch of step 710) or if filters have been applied to the section according to instructions, the filter file system checks to see if there are additional sections that have been received (step 716). If there are sections remaining (the YES branch of step 716), the file system again checks for instructions to apply a filter or filters (step 708) and repeats the steps described previously. If and when there are no more sections (the NO branch of step 716), the filter file system combines the data produced from the application of filters to the sections of data with the correspondence information to create a filter system file (step 718, which is the same as step 624 in FIG. 6).

Figure 8:
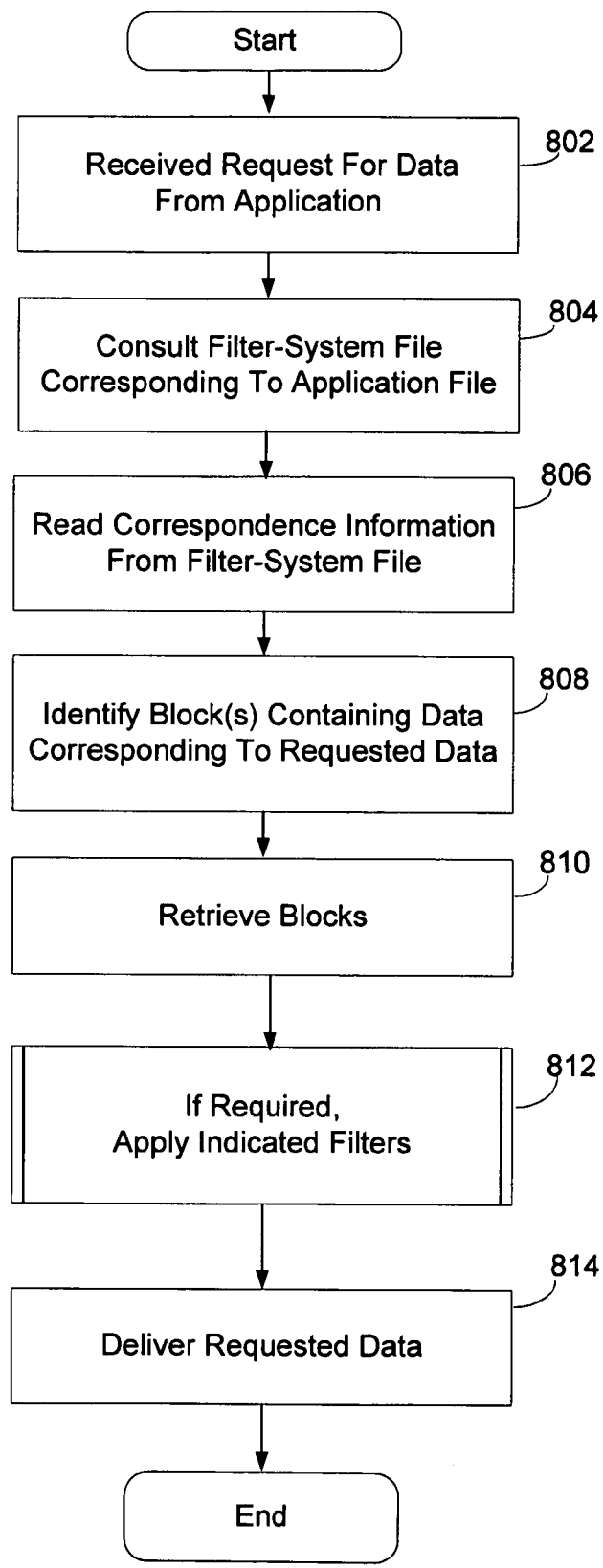
FIG. 8 illustrates a method for retrieving data from a filter-system file.

A method for retrieving data from a filter-system file is shown in FIG. 8. The filter file system receives a request from an application for data from an application file (step 802). The filter file system consults the filter-system file that corresponds to the application file (step 804). The filter file system reads the correspondence information from the filter-system file (step 806). Typically, the correspondence information is included in a header section near the beginning of the file. If the correspondence information is included in a portion of the file near the beginning of the file, it is received before other portions of the file when the file is delivered to the filter file system in order, for example, by streaming the bytes of data in the filter-system file over a network.

The filter file system uses the correspondence information to determine which block or blocks of data in the filter-system file include data corresponding to the data requested by the application (step 808). That is, the filter file system determines which block or blocks of data in the filter-system file can be processed to produce the requested data. The filter file system then accesses the block or blocks of data that correspond to the requested data (step 810). The data can be accessed, for example, by retrieving the block or blocks using a conventional file system.

The filter file system typically cannot process less than a block, even if less than the corresponding section is requested. For example, a section of the application file located at bytes 3,072 to 4,096 of the application file can correspond to a block of data in the filter file system located at bytes 1,024 to 2,048. In this case, a request, for example, for bytes 3,072 to 4,096 of the application file would cause the filter file system to access bytes 1,024 to 2,048 of the filter-system file. A request for a subset of the same section would also cause the filter file system to access bytes 1,024 to 2,048. The filter file system can access more than one block in response to a request for data. For example, a request for bytes 4,000 to 5,000 would cause the filter file system to access data from the previously described block and one or more blocks including data corresponding to bytes 4,096 to 5,000 in the application file.

Once the filter file system has accessed the appropriate block or blocks of data, the filter file system processes the block or blocks to produce the data in the corresponding section or sections of the application file or virtual application file. This processing can include the application of filters (step 812). The processed data is then delivered to the application (step 814). If the processed data includes data that was not requested by the application, the filter file system delivers only the requested data and can, for example, cache the rest of the processed data.

Figure 9:
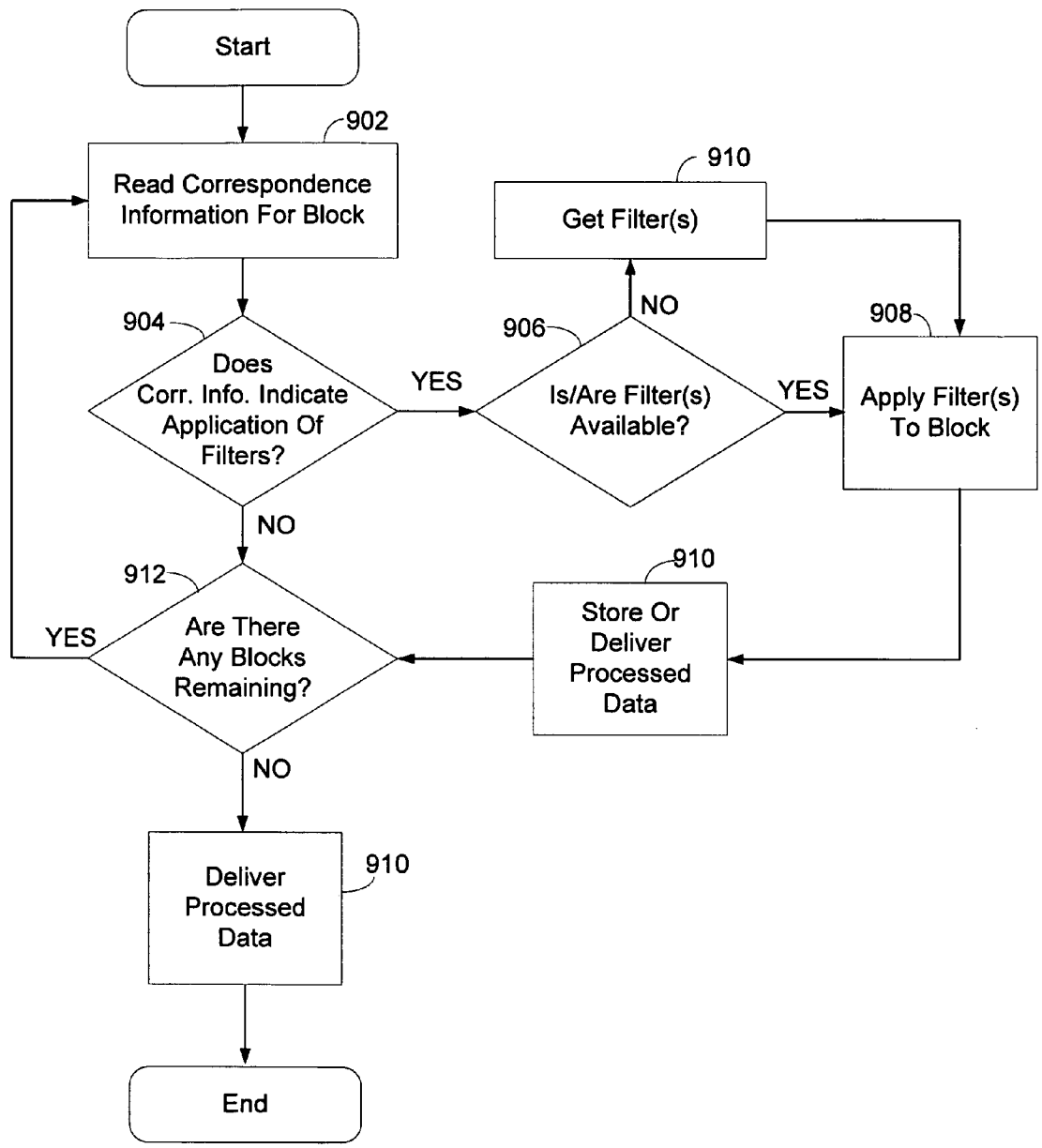
FIG. 9 illustrates a method for applying filters to data retrieved from a filter-system file and delivered filtered data.

A method for applying filters to a block or blocks of data retrieved from the filter-system file is shown in FIG. 9. The filter file system reads the correspondence information for a block from the filter-system file (step 902). If the correspondence information indicates that a filter or filters must be applied to the data in the block to produce the data in the corresponding section of the application file (the YES branch of step 904), the filter file system checks to see if the filter or filters are available (step 906). If the filter or filters are available (the YES branch of step 906), the filter or filters are applied to the block of data (step 908). If the filter or filters are not available (the NO branch of step 906), the filter file system can search for the filter (step for 910). For example, the filter file system can look for appropriate files on a local system, or can broadcast requests for the filter in a network environment. The filter or filters are then applied to the block or blocks of data (step 908). If the filter or filters are not available, the method cannot proceed.

The filter file system can deliver the requested data (step 910). These data can be identical to the data in the section of the application file that corresponds to the accessed block. If the request is for less than all of the data in the section, the filter file system selects the requested data from the processed data and delivers only the requested data from the section corresponding to the accessed block. Alternatively, the filter file system can store the processed data for later delivery.

If the requested data includes data from sections corresponding to more than one block (the YES branch of step 912), the filter file system reads the correspondence information for another block from the filter-system file (step 902). The data in the block is processed and delivered or stored as described previously. If there are no blocks remaining (the NO branch of step 912) and the requested data has not been delivered to the application, it is delivered to the application.

Figure 10:
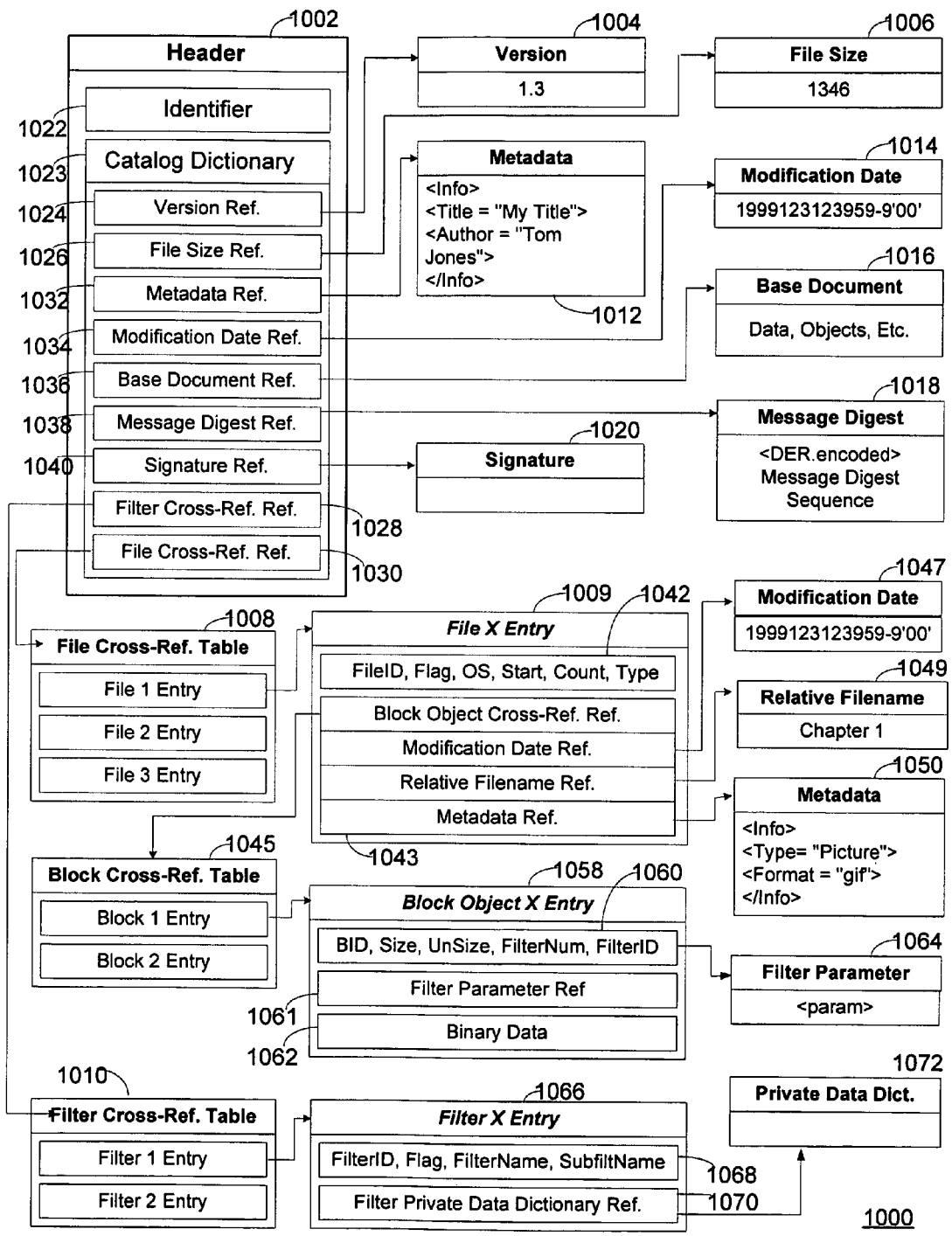
FIG. 10 illustrates a format of a filter-system file.

FIG. 10 illustrates the format of a filter-system file. In this implementation, the filter-system system file 1000 includes a header 1002, which is advantageously located at the beginning of the filter-system file, and a variety of objects 1004, 1006, 1008, 1010, 1012, 1014, 1016, 1018,1020, 1045, 1047, 1049, 1050, 1058, 1064, which can be located anywhere in the file. The location of the header at the beginning of the filter-system file provides early access to the correspondence information when the filter-system file is delivered by streaming.

The header 1002 has an identifier 1022 and a catalog dictionary 1023. The identifier 1022 specifies the file format and any major or minor versions of the file format. In one implementation, the identifier is 12 octets long and can be parsed by parser compatible with the PDF parsers developed by Adobe Systems, Incorporated. For example, the identifier "% CDF-1.3\040\040\040\r" indicates that the file format is CDF and the version is 1.3. The version number in the identifier can be used by a simple parser to determine whether it is able to process the file.

The catalog dictionary 1023 follows the identifier and contains entries or references identifying the locations of various objects in the file. References can be pointers. Location is given, for example, by the number of bytes from the beginning of the file. An entry can contain data such as "'PX ' 00000101," which indicates that object PX begins at byte 00000101. In this example, the catalog dictionary begins at byte 13 and the last entry 1030 in the catalog dictionary 1023 indicates the location of the file cross-reference table 1008. Eight other entries 1024, 1026, 1030, 1032, 1034, 1036, 1038, 1040 in the catalog dictionary 1023 indicate the locations of eight other objects 1004, 1006, 1010, 1012, 1014, 1016, 1018, 1020 in the filter-system file 1000.

The filter-system file 1000 includes version 1004 and file size 1006 objects, and the catalog dictionary 1023 includes entries 1024, 1026 that specify the locations of version 1004 and file size 1006. Version 1004 gives the version numbers for the filter-system file format specified in identifier 1022. File size 1006 gives the size of the file.

If a previously saved version of the file was modified and saved, file size 1006 gives the size of the section of the file corresponding to the previously saved version of the file. File size can be used to determine whether the file has been updated. If the file was updated, there will be blocks including information corresponding to the updates and an original, base document 1016, so that the noted file size is smaller than the actual size of the file. If there are updates, the catalog 1023 located in the update or updates sections can include an entry 1036 indicating the location of the base document 1016 within the filter-system file and a reference 1034 to the modification date 1014.

The filter-system file 1000 can include metadata 1012, which provide information about the file. In one implementation, the metadata are expressed using XML or an XML compatible language, and include title, author, and version of the data file. The catalog dictionary 1023 contains a reference 1032 to any metadata object 1012.

The filter-system file 1000 includes file cross-reference table 1008. File cross-reference table includes entries 1009 for each file in the filter-system file 1000. In this example, each block entry 1009 in the file cross-reference table 1008 provides information 1042 and references 1043 for a file. The information 1042 for each entry 1009 in the file cross-reference table 1008 includes a unique identifier (ID); file flags (Flags) indicating whether to open the file when the filter-system file is opened; a code for operating system (OS) indicating the type of file system used to create the filter-system file; the starting location (ByteStart) and size (ByteCount) of the file; and a code for file type (Type). A PDF file, for example, can be identified using the string "pdf\01."

The references 1043 for each entry 1009 in the file cross-reference table 1008 indicate the following: the location in the filter-system file of an data cross-reference table 1045, the location of the most recent modification date of the original file 1047, and the location of a relative file name 1049. The modification date 1046 is similar in structure to modification date 1014, whose location 1034 is referenced in the catalog dictionary 1023. The modification date 1047 indicates the last time that the file identified in the file cross-reference table entry 1009 was modified. The relative file name 1049 is used as a relative link in HTML or PDF files. A reference indicating the location of metadata 1050 for the file can be included. This metadata object 1050 is similar in structure to metadata object 1012, whose location 1032 is referenced in the catalog dictionary 1023.

The block cross-reference table 1045 is used to map data from the original application file to locations in the filter-system file 1009. Each file indicated by an entry 1009 in the file cross-reference table 1008 has a block cross-reference table 1047. Thus, if there are n files in the file cross-reference table 1008, there will be n block cross-reference tables. In this example, each entry 1054 in the block cross-reference table 1045 provides information for a block object 1058. There is at least one block object for each file in the filter-system file. The information 1054 for each entry in the block cross-reference table 1045 includes a unique identifier for the block object (BlockID); a unique identifier for the file to which the object belongs (fileID); and the starting location (ByteStart) and size (ByteCount) of the data object. The entry 1054 can include a reference indicating the location of another section of the block cross-reference table 1045, for example, if the block cross-reference table is very large.

A block object 1058 contains a block header 1060, references 1061 to other objects in the filter-system file, and filtered binary data 1062 that corresponds to data from the original application file. The block header includes the unique identifier for the object (BID); the existing size of the object (Size); the size of the object before it was filtered (UnSize); the number of filters applied to the data from the original application file (FilterNum); and an array of filter identifiers (filterID). For each identified filter, there is a reference to a filter parameter object 1064, which has parameters needed to apply the filter. The identified filters can be used to derive data from the original application from the binary data in the block object.

The filter-system file 1000 can include a filter cross-reference table 1010. The filter cross-reference table 1010 is used to locate filter information based upon a filter identifier. It is referenced when a block object is accessed. Each entry 1066 in the filter cross-reference table 1010 provides information 1068 and can provide references 1070. The information 1068 includes a filter identifier (filterID); a flag indicating whether the data should be cached as clear text; the name of a registered handler (filterName) for the filter, which was used to create the binary data in a data object; and the name of a registered algorithm for a filter (subFiltName). The references 1070 can indicate, for example, the location of a filter private data dictionary 1072, which can have global data for a specified filter.

It is possible that different filter handlers from different vendors can process the same filtered data. For example, an encryption filter handler from one vender can encrypt data using a particular encryption technique while another vendor's filter handler is used to decrypt the filtered data.

The filter-system file 1000 can include a message digest 1018 and a signature 1020 at or near the end of the file. The message digest 1018 data is used to check the data integrity of the file and, in some cases, to identify uniquely the file. For example, data in the message digest can be encoded with Basic Encoding Rules (BER) along with the object identifier (OID) of the message digest algorithm and the message digest value following common cryptographic standards. The signature 1002 contains a signature of all bytes in the file up to but not including the message digest data 1018, signature data 1020, and any trailer objects. Signature data 1020 can be encoded using PKCS#7 encoding techniques. If the filter-system file includes a message digest 1018 or a signature object 1020, the catalog dictionary 1023 will include an entry 1038, 1040, indicating the location of the included object. The filter-system file can end with a trailer such as % EOF.

Figure 11:
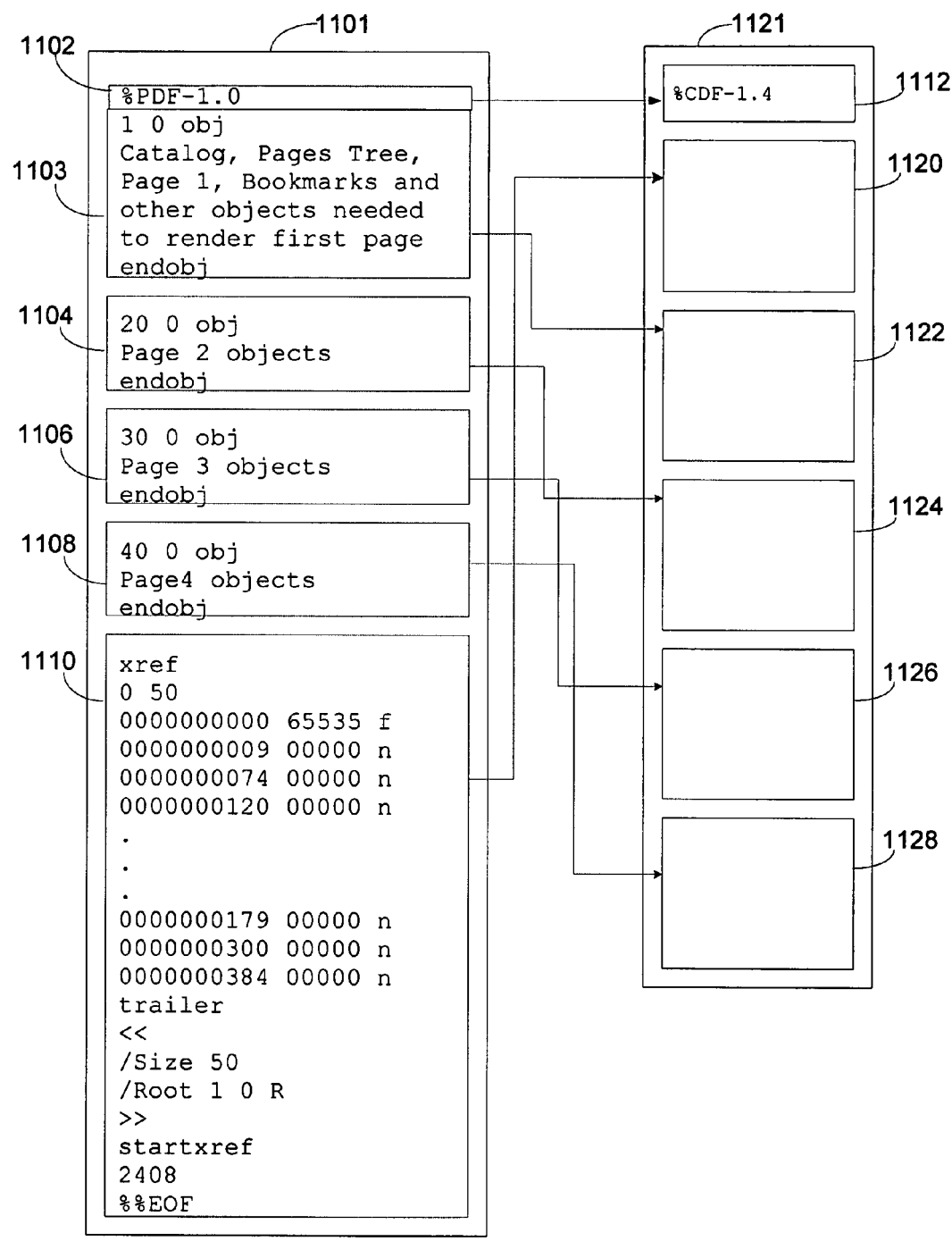
FIG. 11 illustrates an example of a filter-system file.

FIG. 11 provides an example of an application file 1101 and a corresponding filter-system system file 1121 that is consistent with the format illustrated in FIG. 9. The application file 1101 is a PDF file. In the filter file system, the application file 1101 is divided into five sections, 1103, 1104, 1106, 1108, 1110. The first section 1102 includes a line specifying the file format. The second section 1103 includes the data needed to present the first page of the document. The last section 1110 includes a cross-reference table. The cross-reference table contains an entry for each object, specifying the location of that object within the body of the file. Each of the middle sections corresponds to a page in the document. Each of the middle sections includes a catalog, pages tree, bookmarks, and other objects that can be used to render a page.

The filter-system file 1121 that corresponds to the application file 1101 is divided into six blocks. The first block 1112 is a header block. It includes information about the correspondence of information between data in the blocks of the filter-system file and data in the sections of the application file 1101. In this case, it includes only a line indicating the format type of the file and the version of the format type, which corresponds to information given in the first section 1102 of the application file 1101. The filter file system can use this information to identify rules for the identification of blocks and the application of filters to blocks. The filter-system file 1121 includes five other blocks, each of which corresponds to a section in the application file 1101. For example, the last section of the application file 1110 corresponds to the first block 1120 in the filter-system file. This block includes the cross-reference table 945 that is used to locate objects in the file. The middle four sections of the application file 1103, 1104, 1106, correspond to the last four sections 1122, 1124, 1126, 1128 of the filter-system file. One or more of the blocks can include, for example, a compressed or encrypted version of the data in the corresponding section.

Figure 12:
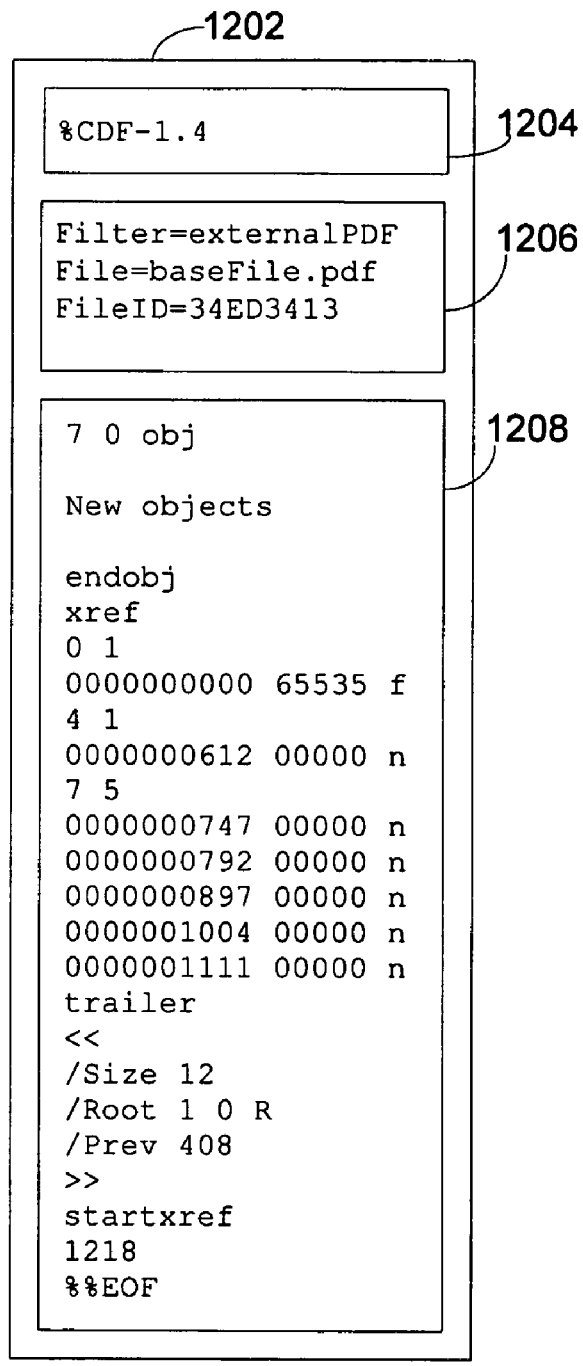
FIG. 12 illustrates an example of an incremental save to a filter-system file.

FIG. 12 shows how a filter file system can be used to track incremental changes or updates to an existing filter-system file. Data that is added to an application file is used to create a new block in the filter-system file or a new file in the filter-system file. For example, block or file 1103 includes data for a new object 1108. The identifier 1104 of the header for the block or file names the filter-system file format and version. The rest of the header 1106 includes a filter, e.g., externalPDF, to be applied to the update block or file. The filter take the next two entries, file and fileID, as parameters. Together, these two arguments identify the application file that is being updated.

If the filter-system file includes multiple application files, then there can be updates for multiple files. If an incremental update contains a file cross reference table, this file cross reference table will replace the previously existing file cross reference table. This replacement allows files to be removed and added from the filter-system file, for example, as incremental versions are saved.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor, or embodied in a propagated signal, or embodied in any combination of the machine-readable storage device and the propagated signal. Method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, steps of the invention can be performed in a different order and still achieve desirable results. The described methods and apparatus can be implemented to process XML files, providing for efficient compression and delivery in a network environment. The invention can be used to store and access documents for ebooks. The invention can be used to access data in a digital camera file, where the digital camera file includes a reference to a separate file such as an audio file. The encoding rules can be different than described here.

What is claimed is:

1. A computer implemented method for retrieving requested data, comprising:

receiving a request from an application to read a portion of an application file, the application file being recognized by the application and having two or more sections of data;

consulting a filter system file, the filter system file containing correspondence information and having two or more blocks of data, each block including a set of processed data corresponding to one or more sections in the application file the correspondence information indicating the locations of the sections in the application file, the locations of the blocks in the filter-system file, and the correspondence between sections in the application file and blocks in the filter-system file;

deriving the requested portion of the application file from the processed data using the correspondence information; and delivering the requested portion of the application file to the application.

2. The method of claim 1, wherein the requested portion includes less than all of che application file.

3. The method of claim 1, wherein the correspondence information is referenced in a header at the beginning of the filter-system file.

4. The method of claim 3, wherein the correspondence information includes a cross-reference table in the filter-system file.

5. The method of claim 4, wherein the cross-reference table is at the beginning of the filter-system file.

6. The method of claim 1, wherein:
the request from the application references an application file; and deriving the requested portion of the application file is performed by reading data from the filter system file through a filter-system API in response to the application request.

7. The method of claim 1, wherein:
the processed data further includes a second set of processed data corresponding to data in a second application file; and
the correspondence information further indicates how the second set of processed data corresponds to the data in the second application file.

8. The method of claim 1, wherein:
the filter-system file has at least one block of data corresponding to data in a second application file; and
the correspondence information further indicates the correspondence of the at least one block of data in the filter-system file and the second application file.

9. The method of claim 1, wherein the two are more sections of data are defined independently of the native structure of the application file.

10. The method of claim 1, wherein the two or more sections of data are defined by the native structure of the application file.

11. The method of claim 10, wherein a section of data is an object in the application file.

12. The method of claim 3, wherein a section of data is a linked file represented in the application file by a link.

13. The method of claim 1, wherein finding the requested portion of the application file by using correspondence information comprises:
determining which section in the application file contains the requested data;
identifying the corresponding block in the filter-system file.

14. The method of claim 1, wherein the requested portion of the application file is a byte range.

15. The method of claim 14, further comprising:
streaming a necessary block, the necessary block corresponding to a section including some of the requested portion of the application file, before streaming an necessary block that precedes the necessary block, the unnecessary block corresponding to a section having none of the requested portion of the application file.

16. The method of claim 1, wherein:
delivering the requested portion of the application file comprises delivering a section that contains some of the requested data before delivering a section that does not contain any of the requested data.

17. The method of claim 1, wherein deriving the processed data includes applying a filter to the processed data to produce the requested data.

18. The method of claim 17, wherein applying a filter decrypts or decompresses processed data in the filter system file.

19. The method of claim 17, further comprising:
using this correspondence information to identify the filter; and
obtaining the filter.

20. The method of claim 19, wherein using the correspondence information to identify a filter includes using a designated data type to identify a registered filter.

21. The method of claim 19, wherein the correspondence information includes parameters for use in applying the filter when decoding the data.

22. The method of claim 17, further comprising:
applying two or more filters to produce the requested data.

23. The method of claim 22, wherein a first filter decrypts processed data to produce decrypted data and a second filter decompresses the decrypted data.

24. The method of claim 22, wherein a first filter decompresses the processed data to produce decompressed data and a second filter decrypts the decompressed data.

25. A computer implemented method for generating a filter system file for use in retrieving data, comprising:
receiving data associated with an application file, the application file being an application's view of the received data, the application being operable to request a portion of the application file,
processing the received data to generate processed data the processed data corresponding to the received data, including identifying two or more sections of received data and generating two or more processed blocks in a filter system file, each processed block corresponding to a section of received data; and
producing correspondence information indicating how the processed data corresponds to the received data, the correspondence information identifies the association of each section of received data with the application file, the location of each processed block in the filter-system file, and the correspondence between each section of received data and each processed block in the filter-system file; and
storing the processed data and the correspondence information in the filter system file.

26. The method of claim 25, wherein the information indicating the correspondence between the processed data and the data received is referenced in a header at the beginning of the filter system file.

27. The method of claim 26, wherein the correspondence information is in a cross-reference table in the filter-system file.

28. The method claim 25, wherein receiving data associated with an application file includes receiving data from an application.

29. The method of claim 25, wherein receiving data associated with an application file includes receiving data from an application file in response to a request from an application.

30. The method of claim 25, wherein processing the data received comprises:
ordering the blocks of data differently than the corresponding sections of received data in the application file.

31. The method of claim 25, wherein the two or more sections are from two or more application files.

32. The method of claim 31, wherein processing the data received comprises:
  ordering, the blocks of data so that a block corresponding to a section from a second application file is between two blocks corresponding to sections from a first application file.

33. The method of claim 31, wherein each section or block is defined by a byte range.

34. The method of claim 33, wherein:
  the order of the blocks permits streaming a necessary block, the necessary block corresponding to a section including some of the requested portion of the application file, before streaming an unnecessary block that precedes the necessary block, the unnecessary block corresponding to a section having none of the requested portion of the application file.

35. The method of claim 25, wherein processing the data received comprises applying a filter to at least a portion of the data received.

36. The method of claim 35, wherein applying a filter encrypts or compresses at least a portion of the data received.

37. The method of claim 25, wherein processing the data received comprises:
  retrieving a filter;
  applying the filter to some of the data received; and
  producing correspondence information to identify a filter to be used to respond to a request for a portion of the application.

38. The method of claim 37, wherein producing correspondence information to identify a filter includes identifying a data type that identifies a registered filter.

39. The method of claim 37, wherein the correspondence information includes parameters for use in applying the filter.

40. The method of claim 37, wherein applying a filter includes applying two or more filters to produce the requested data.

41. The method of claim 40, wherein a first filter encrypts processed data to produce encrypted data and a second filter compresses the encrypted data.

42. The method of claim 40, wherein a first filter compresses the processed data to produce compressed data and a second filter encrypts the compressed data.

43. A computer program product, tangibly embodied in any combination of a machine-readable medium and a propagated carrier signal, for retrieving requested data, comprising instructions operable to cause a programmable processor to:
  receive a request from an application to read a portion of an application file, the application file being formatted to be recognized by the application and having two or more sections of data;
  consult a filter system file, the filter-system file containing correspondence information and having two or more blocks of data, each block including a set of processed data corresponding to one or more sections in the application file, the correspondence information indicating the locations of the sections in the application file, the locations of the blocks in the filter-system file, and the correspondence of each section in the application file to a block in the filer-system file;
  derive the requested portion of the application file from the processed data using the correspondence information; and
  deliver the requested portion of the application file to the application.

44. The computer program product of claim 43, wherein the correspondence information is referenced in a header at the beginning of the filter system file.

45. The computer program product of claim 43, wherein the correspondence information includes a cross-reference table in the filter-system file.

46. The computer program product of claim 43, wherein:
  the request from the application file references an application file; and
  instructions to derive the requested portion of the application file include instructions to read data from the filter system file through a filter-system API in response to the application request.

47. The computer program product of claim 43, wherein:
  the processed data further includes a second set of processed data corresponding to data in a second application file; and
  the correspondence information further indicates how the second set of processed data corresponds to the data in the second application file.

48. The computer program product of claim 43, wherein:
  the filter-system file has at least one block of data corresponding to data in a second application file; and
  the correspondence information further indicates the correspondence of the block of data in the filter-system file and the second application file.

49. The computer program product of claim 43, wherein:
  instructions to deliver the requested portion of the application file include instructions for delivering a section that contains some of the requested data before delivering a section that does not contain any of the requested data.

50. The computer program product of claim 49, wherein applying a filter decrypts or decompresses processed data in the filter-system file.

51. The computer program product of claim 20, wherein the information indicating the correspondence between the processed data and the data received is referenced in a header at the beginning of the filter-system file.

52. The computer program product of claim 50, wherein the correspondence information is in a cross-reference table in the filter-system file.

53. The computer program product of claim 52, wherein the two or more sections are from two or more application files.

54. The computer program product of claim 50, wherein:
  processing the received data includes identifying two or more sections and generating two or more processed blocks, each processed block corresponding to a section of data received; and
  the correspondence information identifies the location of each section in the data received, the location of each processed block in the filter-system file, and the correspondence between each section in the data received and each processed block in the filter-system file.

55. The computer program product of claim 50, wherein instructions to process the data received comprise:
  instructions to order the blocks of data differently than the corresponding sections of received data in the application file.

56. The computer program product of claim 55, wherein applying a filter encrypts or compresses at least a portion of the data received.

57. The computer program product of claim 50, wherein instructions to process the data received comprises instructions to apply a filter to at least a portion of the data received.

58. The computer program product of claim 43, wherein deriving the processed data includes applying a filter to the processed data to produce the requested data.

59. A computer program product, tangibly embodied in any combination of a machine-readable medium and a propagated carrier signal, for use in generating a filter-system file, comprising instructions operable to cause a programmable processor to:

receive data associated with an application file, the application file being an application's view of the received data, the application being operable to request a portion of the application file;

process the received data to generate processed data, the processed data corresponding to the received data, including identifying two or more sections of received data and generating two or more processed blocks in a filter system file, each processed block corresponding to a section of received data;

produce correspondence information indicating how the processed data corresponds to the received data, the correspondence information identifying the association of each section of received data with the application file, the location of each processed block in the filter system file, and the correspondence between each section of received data and each processed block in the filter system file; and store the processed data and the correspondence information in the filter system file.

* * * * *

UNITED STATES PATENT AND TRADEMARK OFFICE
CERTIFICATE OF CORRECTION

PATENT NO. : 6,970,866 B1
DATED : November 29, 2005
INVENTOR(S) : James D. Pravetz and Richard L. Sites It is certified that error appears in the above-identified patent and that said Letters Patent is hereby corrected as shown below:

Column 17,
Line 9, delete "che" and replace with -- the --;
Line 45, delete "3" and replace with -- 10 --;
Line 60, delete "necessary" and replace with -- unnecessary --;

Column 18,
Line 39, delete "identifies" and replace with -- identifying --;

Column 19,
Line 3, delete "ordering," and replace with -- ordering --;
Line 62, delete "filer" and replace with -- filter --;

Column 20,
Line 36, delete "20" and replace with -- 50 --.

Signed and Sealed this

Sixth Day of June, 2006

JON W. DUDAS
*Director of the United States Patent and Trademark Office*